Sept. 24, 1957  W. A. DEANS  2,807,341
VEHICLE CONTROL MECHANISM
Filed April 18, 1955  2 Sheets-Sheet 2
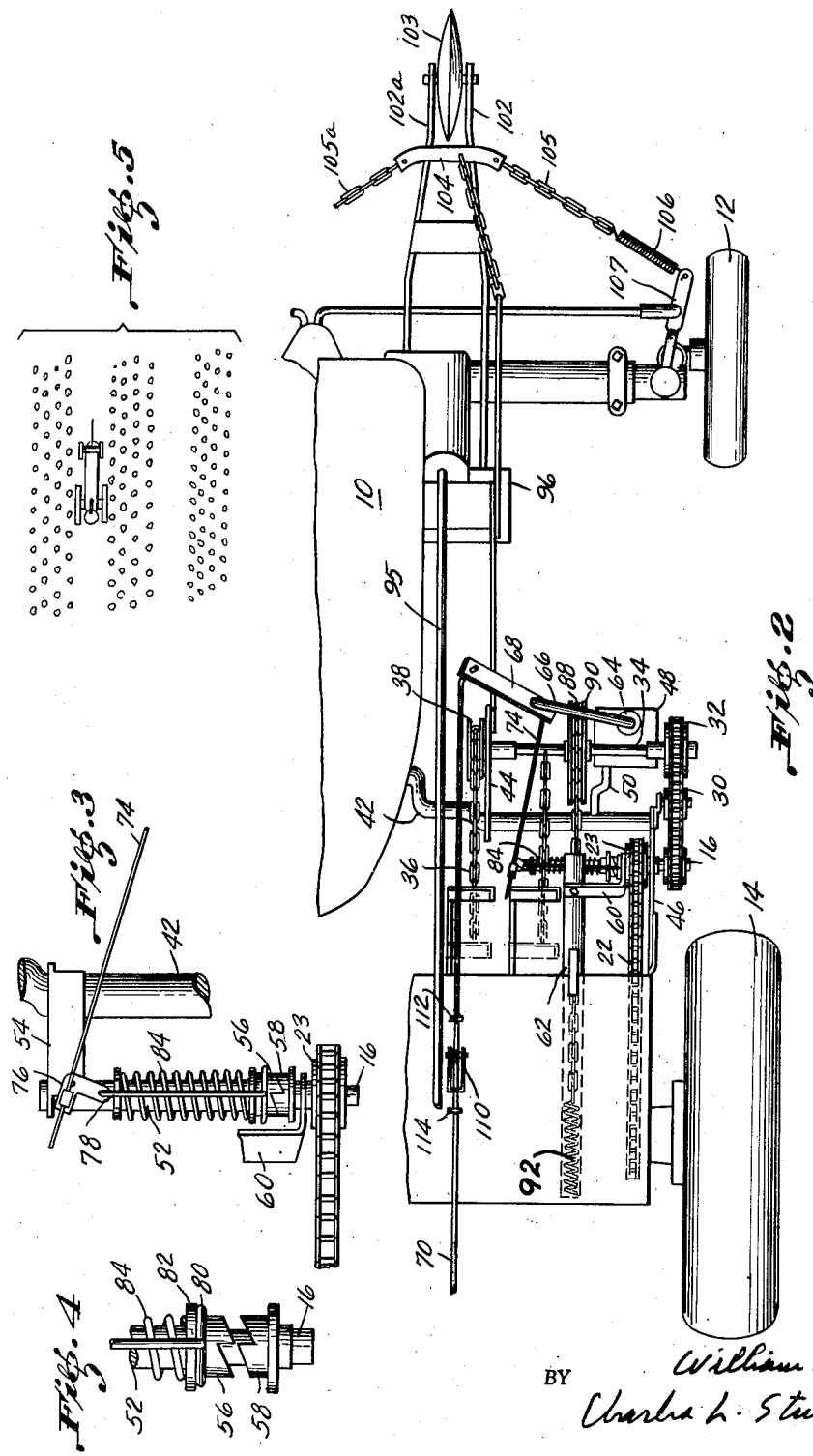
INVENTOR
William A. Deans
BY
Charles L. Sturtevant
ATTORNEY

United States Patent Office 2,807,341
Patented Sept. 24, 1957

2,807,341

VEHICLE CONTROL MECHANISM

William A. Deans, Wilson, N. C., assignor of one-half to William C. Herring, Wilson, N. C.

Application April 18, 1955, Serial No. 501,935

19 Claims. (Cl. 192—13)

The present invention relates to new and useful improvements in control mechanism for powered vehicles, and more particularly to such improvements in control mechanism for tractors and other farm equipment vehicles.

In general, this invention contemplates the provision of control mechanism, either formed originally as a part of the vehicle or as a readily attachable adjunct thereto, for effecting movement of the vehicle unattended for predetermined time or distance intervals with automatic stopping of the vehicle at the end of such predetermined interval at which time the attendant may again initiate progress of the vehicle and repetition of the cycle of movement in convenient manner. Thus, using farm equipment for purposes of example, a tractor may have attached thereto a trailing vehicle, such as a wagon or other collecting vehicle, into which material to be accumulated may be deposited, as for instance in collecting harvested crops such as tobacco and the like. The steering of the vehicle may be set in a predetermined course or guide means may be provided to travel in a preformed furrough or the like to assure proper directional movement of the vehicle. The tractor or other vehicle may thus be started to travel a predetermined distance before automatically stopping and without the necessity of an operator being on the tractor. Thus, a walking attendant may collect the harvested crops or do such other chores as the situation may call for without having to attend the vehicle operation. The control mechanism may also be applied to other forms of vehicles where it is desired that the vehicle progress a predetermined distance and then automatically stop before the cycle of movement is again initiated such, for example, in harvesting machines of various types where the harvesting may be accomplished by the machine without the necessity of an operator being thereon at least for purposes of driving the same.

With the above in mind, one of the principal objects of the present invention is to provide a tractor or other powered vehicle with control mechanism such that it will progress a predetermined degree and stop unattended and then have its starting initiated to repeat the cycle of movement, thus leaving the cropper or other worker free to collect the materials for accumulation in a trailing wagon or the like, or for such other purposes as the particular job may require.

Another object of the invention is to provide the above type of control mechanism in association with the movement control mechanism of the tractor or other vehicle to effect stopping of the tractor after a predetermined degree of movement at which time starting of the tractor may again be initiated.

A further object of the invention is to provide a control mechanism of the above type which includes a drive connection interposed between the tractor power take-off and the brake and clutch mechanism to effect the desired cycle of movement.

A still further object of the invention is to provide a control mechanism of the above type wherein the drive connection includes a clutch mechanism which, upon release, permits automatic release of the brake and clutch mechanism to effect starting of the tractor for a further predetermined degree of movement.

A still further object of the invention is to provide a control mechanism, in the nature of a metering mechanism, which may be adjusted for any particular tractor to cause the same to progress a predetermined distance before automatically stopping.

And a still further object of the invention is to provide a control mechanism substantially of the above type wherein the tractor, clutch and brake pedals are connected thereto for movement toward tractor stopping position in accordance with the predetermined degree of movement desired.

The invention still further aims to provide a control mechanism substantially of the above type which may be conveniently formed as a package unit for application to existing tractors with very little mechanical alterations being involved; which is relatively simple in construction and assembly; which is easily installed and operated, and which is thoroughly reliable in use.

The above and other objects of the invention will in part be obvious and will be hereinafter more fully pointed out in the accompanying drawings, in which Fig. 1 is a side elevation of a tractor showing the installed control mechanism in tractor stopping position, and also showing a front steering guide in full line inoperative position and in dotted line guiding position;

Fig. 2 is a fragmentary top plan view of the tractor showing the control mechanism with the tractor brake and clutch in full line stopping position and in dotted starting position;

Fig. 3 is a fragmentary enlarged top plan view of the interposed driving connection and clutch between the power take-off and the brake and clutch mechanism, with a showing of the control lever for actuating the clutch;

Figure 1:
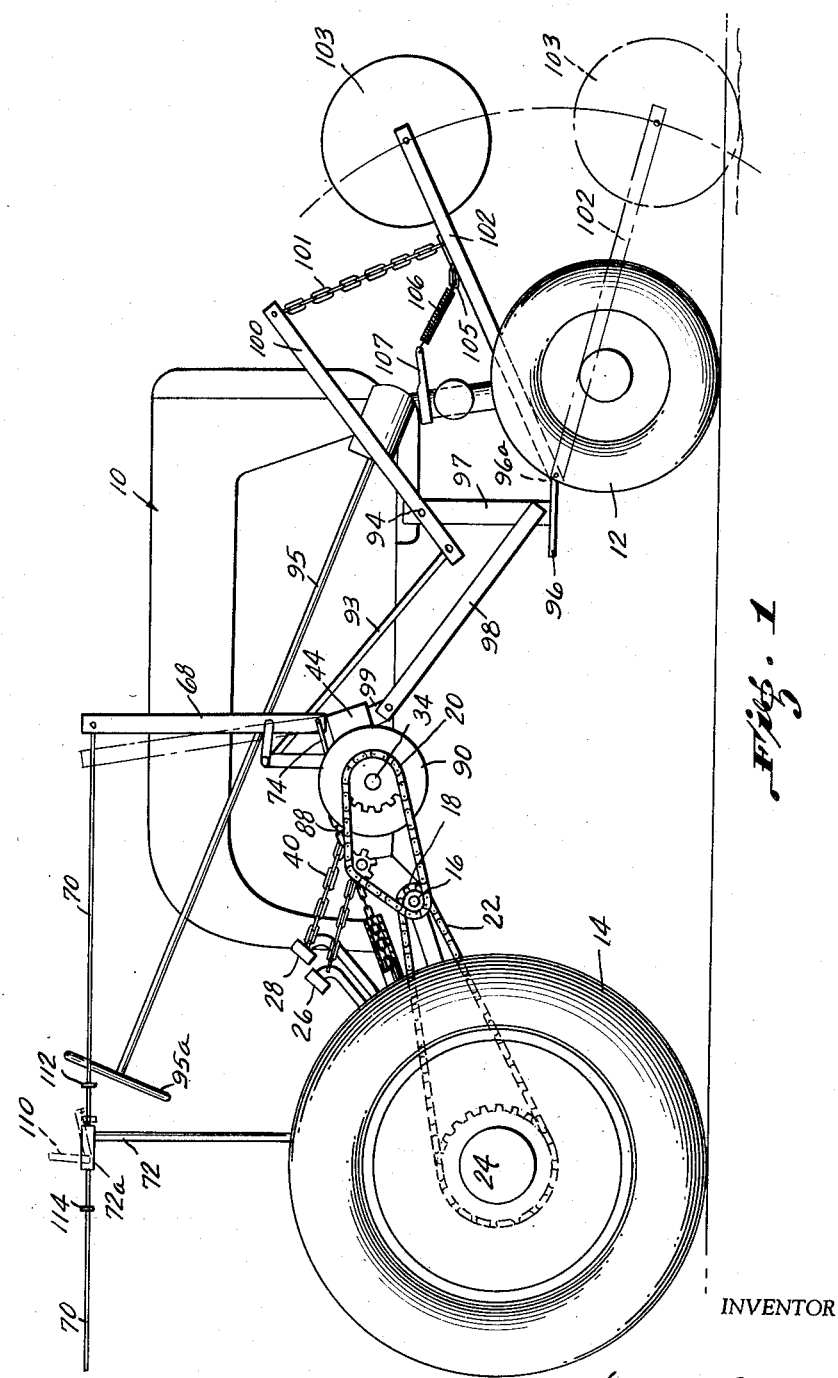

Fig. 4 is a further enlarged fragmentary detail showing the interposed clutch in released position permitting the brake and clutch mechanism to be released to tractor starting position, and Fig. 5 is a schematic plan showing a tractor in position between rows of crops, such as tobacco, wherein one or more rows has been omitted after every five or six rows to provide a tractor and trailing vehicle path therealong.

Referring more in detail to the accompanying drawings, and particularly to Figs. 1 and 2 at this time, there is shown a conventional type of tractor, generally indicated by the numeral 10, having front steering wheels 12 and rear driving wheels 14 and a power take-off stub shaft 16 driving a sprocket 18 over which a chain 20 is trained. The take-off shaft 16 is illustrated as being driven by means of a chain 22 or the like from the rear axle 24 of the tractor to a sprocket 23.

The conventional brake and clutch pedals for the tractor are designated by the numerals 26, 28, respectively, and upon throwing of the clutch pedal 26, the drive to the power take-off shaft through the chain 22 is disconnected in conventional manner. It is to be clearly understood that the tractor shown is for purposes of illustration but that the control mechanism may be applied to other types of tractors with necessary variations to accommodate the same to such other types of tractors.

The chain 20 is trained over an idler sprocket 30 and thence over a forwardly disposed sprocket 32 which is connected to a shaft 34. There is a chain 36, or other suitable connecting means, connecting the clutch pedal 26 with a pulley 38 on the shaft 34. There is a similar chain 40, or other suitable connecting means, between the brake pedal 28 and the shaft 34.

To support the mechanism thus far described, there is provided a heavy angle arm 42 projecting laterally from the tractor frame and to which is secured a plate 44 providing a bearing for the shaft 34. At the outer end of the arm 42 there is also provided a supporting plate 46 providing a bearing for the take-off shaft 16. There is provided a supporting plate 48 connected by a frame member 50 to the arm 42 and also providing a bearing for the outer end of the shaft 34.

The take-off shaft 16 telescopes within the sprocket assembly 23 and is connected to a shaft part 52 rotatable in suitable bearings and being supported by the frame piece 54 which is also connected to the arm 42. This shaft part 52 has splined thereto one part 56 of a ratchet or other type clutch. The other clutch part 58 is driven directly from the sprocket 23 by the power take-off chain 22 so that when the clutch parts are engaged, the projecting stub shaft 16 is driven from the power take-off chain drive mechanism. An additional bracket piece 60 is connected to a rearwardly projecting tubular member 62 secured to the tractor frame and this bracket provides a bearing for the rotating shaft part 52 to which the clutch is splined.

A tubular post member 64 projects upwardly from the frame plate 48 and carries an inward extension 66 to which a lever plate or arm 68 is pivoted. The upper free end of the arm 68 is connected to a control link 70 projecting rearwardly of the tractor through a supporting frame 72 and is thus readily accessible at any point removed and remote from the actual normal control area of the tractor. The lower end of the lever arm 68 is connected by a link 74 to one arm of a bell crank lever 76 pivoted to the frame member 54. The opposite end of the bell crank 76 is connected by a link 78 to a ring member 80 encircling the clutch part 56 which has a flange or collar 82 against which the ring member may be urged upon manipulation of the control link 70. A coil spring 84 surrounds the shaft part 52 and bears at its inner end against a collar 85 to normally press against the clutch collar 82 and urge the clutch part 56 toward engaging position with the other clutch part 58.

With the clutch parts in engagement, as shown in Fig. 3, and assuming the tractor clutch and brake to be released, the power take-off chain 22 is driven with forward movement of the tractor and the stub shaft 16 is also driven which in turn, drives the shaft 34 through the connecting chain 20. With this rotation of the shaft 34, the clutch chain 36 will be wound on the pulley 38 and the brake chain 40 will be wound on the shaft 34, more movement of the brake pedal being ordinarily required than movement of the clutch to neutral position. However, the length of chains and the number of windings thereof will depend on the particular type and operational characteristics or pecularities of the tractor employed and may be adjusted accordingly. Likewise, the degree of forward movement of the tractor, before automatic stopping thereof, can be varied by altering the length of chains and also the amount of winding thereof.

Upon continued forward motion of the tractor, the chains will be wound on the shaft 34 to such a degree that the clutch will be thrown and the brakes applied, thus to stop the tractor after its predetermined degree of movement.

To again initiate starting of the tractor, the control link 70 may be pulled by the attendant at some point in rear of the tractor and this will in turn rock the lever 68 and the bell crank 76 to pull, through the link 78, the ring member 80 into engagement with the collar 82 which will then withdraw the clutch part 56 from engagement with the clutch part 58 and assume the position shown in Fig. 4. During rotation of the shaft 34 as the tractor progresses in its forward movement, a chain 88 will also be wound on a pulley 90 carried by the shaft 34. The opposite end of the chain 88 projects into the rearwardly extending tube 62 and is connected to a spring 92 fixed therein. Thus, the chain is wound on the pulley 90 by rotation of the shaft 34 and stresses the spring 92.

When, therefore, the clutch parts 56, 58 are disengaged, as shown in Fig. 4, the shaft 16 is free to be turned within the sprocket 23 of the power take-off mechanism and the stressed spring 92 acting on the chain 88 will immediately unwind the shaft 34 to its original position and in doing so the chains 36, 40 will be released and the clutch and brake pedals shifted to starting position, that is, with the tractor drive mechanism in engagement and the brakes released. Upon release of the control link 70, the spring 84 will immediately shift the clutch part 56 back into engagement with the clutch part 58 so as to again effect driving of the shaft 34 through the chain drive 20, to repeat the predetermined cycle of movement.

On locations where there is an even surface without obstructions tending to shift the tractor steering wheels 12, these wheels and steering column 95 may be locked in straight forward position in conventional manner. However, because of the terrain over which tractors of this type are generally operated, there is provided a leading guide mechanism for the purpose of guiding the steering wheels according to a predetermined ground formation. There is provided a frame or plate member 96 supported from the tractor frame by a strap 97 and also by an angular strap 98 which is connected to an extension 99 of the frame plate 44. A lever 100 is pivoted, as at 94, to the strap 97 and the inner end of the lever 100 is connected by an operating rod 93 to the tractor hydraulic mechanism (not shown) through which rod 93 the lever 100 may be selectively shifted about its pivot 94. The forward end of the lever 100 is connected to a depending chain 101 which is connected to a cross member 104 joining two arms 102, 102a which together form a supporting fork for a guiding wheel 103 at the forward ends thereof, the rear ends of these arms, as at 96a, being pivoted to the frame plate 96. The outboard ends of the cross arm 104 are connected to chains 105, 105a or the like and the ends of these chains are then connected by coil springs 106 to the steering operating arms 107 which are under control of the steering column 95 in known manner.

In the use of this guide device for controlling the tractor steering wheels, there is provided between rows of crops to be harvested a furrough running centrally therethrough and the lever 100 may be lowered by means of the tractor hydraulic mechanism to the dotted line position of Fig. 1 wherein the guide wheel 103 is positioned in the preformed furrough. Then, in advancing the tractor, the guide wheel 103, in following the furrough, will automatically direct the tractor in proper line between the rows of crops without any steering attendance by the worker. The springs 106 connecting the ends of the chains 105, 105a to the steering arms 107 serve to absorb shock and other movements occasioned by the guide wheel following the sides of the preformed furrough.

When the tractor is to be moved from place to place for different operations or for turning to follow other rows of crops, the lever 100 may be elevated by the hydraulic mechanism to raise the guide wheel 103 to substantially the position shown in full lines in Fig. 1. In this position of the guide wheel 103, the attendant can manipulate the tractor steering column 95 through the conventional steering wheel 95a to turn or otherwise manipulate the tractor. During this manipulation of the tractor, and also when the tractor is travelling longer distances between various locations, it is necessary to maintain the clutch parts 56, 58 disengaged so that the tractor operator can manipulate the clutch and brake pedals in conventional manner. To this end, the control rod 70 extends through a supporting housing 72a at the top of the standard 72. The housing 72a, or other rod support, has pivoted thereto the free ends of a U-shaped link 110 which straddles the control rod 70. Thus, when the control rod 70 is pulled rearwardly to the dotted line position of Fig. 1 for disengaging the clutch parts 56, 58, and consequently preventing rotation of the shaft 34 in order to leave the chains 36, 40 in relaxed position, a collar 112 on the control rod 70 is also shifted to the dotted line position where the link 110 will engage the collar 112 between the collar and the end of the lever 68. Thus, the tendency for the spring 84 to shift the control rod forwardly and the clutch parts 56, 58 into engagement, is prevented by engagement of the closed end of the link 110 with the collar 112. In this condition, the tractor can be operated in conventional manner without interference of any sort from the control attachment. Or, conversely, the link 110 may be shifted to a reverse position to abut the inside edge of a collar 114, and also prevent forward movement of the lever 68 and control rod 70. By properly positioning the collars on the control rod 70, the link 110 may also be positioned to prevent inadvertent pulling of the control rod to set the control mechanism into operation.

From the foregoing description, it will be appreciated that the present invention provides an attachment for a tractor or other vehicle by means of which movement of the tractor or vehicle is controlled automatically for progressive movement and automatic stopping after preselected distances of travel. With such an assembly, the tractor or other vehicle is permitted to progress without attendants because it will automatically stop after the pre-selected distance has been traversed. Thus, there is no need for an operator in constant attendance on the tractor and a walking attendant can accomplish the desired movement of the tractor and at the same time accomplish other duties such as collecting crops or the like. Of course, it will be understood that some type of harvesting machine, such as a mower or the like, may be attached to the tractor in place of or in addition to a trailing collecting vehicle so that while the tractor is moving without attendants, a worker can be accomplishing other duties.

The attachment has been shown as including frame means for attachment to the illustrated type of tractor. However, the invention contemplates various adaptations of the attachment to enable the same to be attached to tractors of other types of power take-off mechanisms and the like. For example, if a tractor power take-off does not include a clutch mechanism as illustrated, some type of clutch mechanism can be included in the attachment for the purposes outlined. Likewise, in some instances it may be more convenient to effect driving of the operating means for the clutch and brake mechanism to be in the form of direct gearing rather than the illustrated chain drive. The location of the attachment will likewise depend upon the particular type of tractor used. The control mechanism for the attachment is such that it may be readily rendered inoperative so that the tractor can be handled in conventional manner by an operator seated thereon. Similarly, the guiding wheel may be elevated to the full line position in Fig. 1, and here again the tractor can be operated in a conventional manner.

Of course, each tractor of any type may have different individual operating characteristics such as a different throw of brake or clutch for clutching and braking the vehicle. The chain connections between the brake and clutch pedals may have their lengths altered to suit each particular tractor and the distances it is desired for the tractor to travel. Also, the size of pulley on the operating shaft may be varied to take care of different lengths of chains and to also take care of different distances of travel. For instance, if a longer distance of travel is desired, the chains may be lengthened so that there is more slack between the operating means and the pedals, or, conversely, the size of the pulleys may be varied and it is, of course, to be understood that the chain for the brake pedal may also be wound on a pulley if desired, although generally speaking the brake pedal requires a longer distance of travel to be effective than the clutch. Instead of the retracting spring 92 operating in the tubular housing 62, other forms of devices for reversely rotating the shaft and unwinding the chains may be provided, as for instance, a coil spring may be associated with the shaft 34 and the supporting framework to effect this reverse rotation of the shaft when the drive connection from the power take-off is disconnected.

While certain forms of the invention have been shown and described for purposes of illustration, it is to be clearly understood that various changes in the details of construction and arrangement of parts may be made to adapt the attachment to various forms of tractors without departing from the scope and spirit of the invention as set forth in the appended claims.

I claim:

1. In a tractor having ground engaging driving elements and clutch and brake mechanism for controlling the driving elements, the provision of operating means connected to said mechanism to effect cyclic unidirectional movement of the tractor and including driving means for shifting the said mechanism to a position for stopping the driving elements, and means operable after a predetermined cycle of movement to release the said mechanism for shifting thereof to a position for starting the driving elements to drive the tractor in the same direction.

2. In a tractor as claimed in claim 1, wherein the operating means includes a metering connection with said mechanism permitting predetermined variations in the cycle of movement of the tractor.

3. In a tractor as claimed in claim 1, wherein there is provided means for disconnecting the operating and driving means to permit release of said mechanism to tractor starting position.

4. In a tractor having movement control mechanism, the provision of operating means having a predetermined cycle of operation to be repeated connected to said mechanism and including driving means operable to shift the movement control mechanism to a position for stopping the tractor, means for disconnecting the driving means from the operating means, and means operable during such disconnection between the operating and driving means to release the movement control mechanism for shifting thereof to a position for starting the tractor and conditioning the operating means for a further cycle of operation.

5. In a tractor as claimed in claim 4, wherein the driving means includes a power take-off associated with the tractor.

6. In a tractor as claimed in claim 4, wherein the operating means includes a clutch device to connect and disconnect the operating and driving means.

7. In a tractor as claimed in claim 6, wherein there is provided a control lever for shifting the clutch device to inoperative position and against the action of spring means for shifting the clutch to operative position.

8. In a tractor as claimed in claim 7, wherein there is provided means operable upon release of said clutch device to shift the movement control mechanism to a position for starting the tractor.

9. In a tractor having a power take-off and brake and clutch mechanism; the provision of operating means having a predetermined cycle of operation and connected to said brake and clutch mechanism and including a drive connection with said power take-off for initiating and progressively applying the brake and clutch mechanism to stop the tractor, means operable to disconnect said drive connection, and means effective to release the brake and clutch mechanism upon the disconnection of said operating means from the drive connection.

10. In a tractor as claimed in claim 9, wherein the drive connection includes a clutched shaft and wherein manually operated lever means is provided to release the clutch included in said shaft and permit the brake and clutch mechanism to shift to tractor starting position.

11. In a tractor having a power take-off and brake and clutch mechanism; the provision of operating means for said brake and clutch mechanism including a drive shaft connected with said power take-off, means connecting said drive shaft with said brake and clutch mechanism to shift the said mechanism to a position to stop the tractor upon rotation of the drive shaft in one direction, clutch means operable to disconnect the drive shaft from said power take-off, and spring means effective to reversely rotate the drive shaft and release the brake and clutch mechanism upon disconnection of the power take-off from said drive shaft.

12. In a tractor as claimed in claim 11, wherein the connection between the brake and clutch mechanism includes flexible connectors adapted to be wound on said drive shaft.

13. In a tractor as claimed in claim 11, wherein the spring means to reversely rotate the shaft includes a flexible connector adapted to be wound on the drive shaft to tension the spring means for unwinding the connector upon disconnection of the shaft and power take-off.

14. In a tractor as claimed in claim 11, wherein a control rod is connected by lever means to the clutch means for disengaging the same.

15. In a tractor as claimed in claim 14, wherein there is provided a frame supporting the control rod and wherein the frame includes lever means to engage the control rod to hold the same in clutch disengaging position whereby to permit the tractor to be operated in normal manner.

16. A control device adapted for attachment to a tractor having clutch and brake mechanism and a power take-off; and comprising frame means adapted for attachment to the tractor, operating means having a predetermined repeatable cycle of operation carried by said frame means, means providing a driving connection between said operating means and the tractor power take-off, and means for connecting said operating means with said brake and clutch mechanism for a predetermined cycle of operation to effect progressive movement of the clutch and brake mechanism to tractor stopping position.

17. A control device as claimed in claim 16, wherein the operating means comprises a shaft journaled in the frame means and connected to flexible connectors adapted to connect the brake and clutch mechanism therewith and adapted to be wound thereon.

18. A control device as claimed in claim 16, wherein the frame means includes attachment means for a lever mechanism adapted for connection with the tractor power take-off to control the same.

19. A control device as claimed in claim 16, wherein the operating means comprises a shaft having multiple pulleys of different sizes thereon depending upon the degree of movement to be imparted to the tractor, and wherein flexible connectors of varying lengths are attached to said pulleys and are adapted for attachment to the clutch and brake mechanism of the tractor.

References Cited in the file of this patent

UNITED STATES PATENTS

| | | |
|---|---|---|
| 1,291,969 | McFarland | Jan. 21, 1919 |
| 1,601,944 | Davidson et al. | Oct. 5, 1926 |
| 1,696,851 | Krupp | Dec. 25, 1928 |
| 2,491,363 | Dehn | Dec. 13, 1949 |